US009842324B2

(12) United States Patent
Chugo

(10) Patent No.: US 9,842,324 B2
(45) Date of Patent: Dec. 12, 2017

(54) BANKNOTE PROCESSING DEVICE, AND BANKNOTE PROCESSING METHOD

(71) Applicant: Oki Electric Industry Co., Ltd., Tokyo (JP)

(72) Inventor: Akihiro Chugo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 247 days.

(21) Appl. No.: 14/417,136

(22) PCT Filed: Jul. 17, 2013

(86) PCT No.: PCT/JP2013/069446
§ 371 (c)(1),
(2) Date: Jan. 23, 2015

(87) PCT Pub. No.: WO2014/024652
PCT Pub. Date: Feb. 13, 2014

(65) Prior Publication Data
US 2015/0235188 A1   Aug. 20, 2015

(30) Foreign Application Priority Data
Aug. 9, 2012   (JP) .................................. 2012-177066

(51) Int. Cl.
G06Q 20/42         (2012.01)
G06Q 20/04         (2012.01)
(Continued)

(52) U.S. Cl.
CPC ......... *G06Q 20/042* (2013.01); *G06Q 20/027* (2013.01); *G06Q 20/18* (2013.01)

(58) Field of Classification Search
None
See application file for complete search history.

(56) References Cited

U.S. PATENT DOCUMENTS 5,284,339 A     2/1994   van Opstal et al.
6,328,166 B1 *  12/2001  Sakai ................. G07D 11/0084
                                                        194/249
(Continued)

FOREIGN PATENT DOCUMENTS

JP   H05-193817 A   8/1993
JP   H07-21442 A    1/1995
(Continued)

*Primary Examiner* — Elda Milef
*Assistant Examiner* — Gregory S Cunningham, II
(74) *Attorney, Agent, or Firm* — Rabin & Berdo, P.C.

(57) ABSTRACT

A banknote processing device includes a first pay-out port and a second pay-out port in which banknotes for pay-out are stacked, a conveyance section that conveys banknotes to the first pay-out port or to the second pay-out port, a first opening-closing member capable of opening and closing the first pay-out port by moving, a second opening-closing member capable of opening and closing the second pay-out port by moving, and a controller that controls conveyance of the banknotes by the conveyance section, and that controls opening and closing operations of the first and second opening-closing members. When the number of banknotes stacked in the first pay-out port has reached a maximum stacking number in pay-out processing, the controller performs a switching operation to switch a conveyance destination of the banknotes from the first pay-out port to the second pay-out port, and performs an opening operation to open the first opening-closing member.

8 Claims, 14 Drawing Sheets

(51) Int. Cl.
*G06Q 20/02* (2012.01)
*G06Q 20/18* (2012.01)

(56) References Cited

U.S. PATENT DOCUMENTS

| | | | |
|---|---|---|---|
| 6,540,090 B1 * | 4/2003 | Sakai | G07D 11/0018 194/249 |
| 2003/0015395 A1 * | 1/2003 | Hallowell | G07D 7/00 194/206 |
| 2010/0245043 A1 | 9/2010 | Doi et al. | |
| 2011/0004337 A1 * | 1/2011 | Doi | B65H 39/115 700/223 |

FOREIGN PATENT DOCUMENTS

| | | |
|---|---|---|
| JP | 2001-093022 A | 4/2001 |
| JP | 2010-231784 A | 10/2010 |
| JP | 2012-118610 A | 6/2012 |

\* cited by examiner

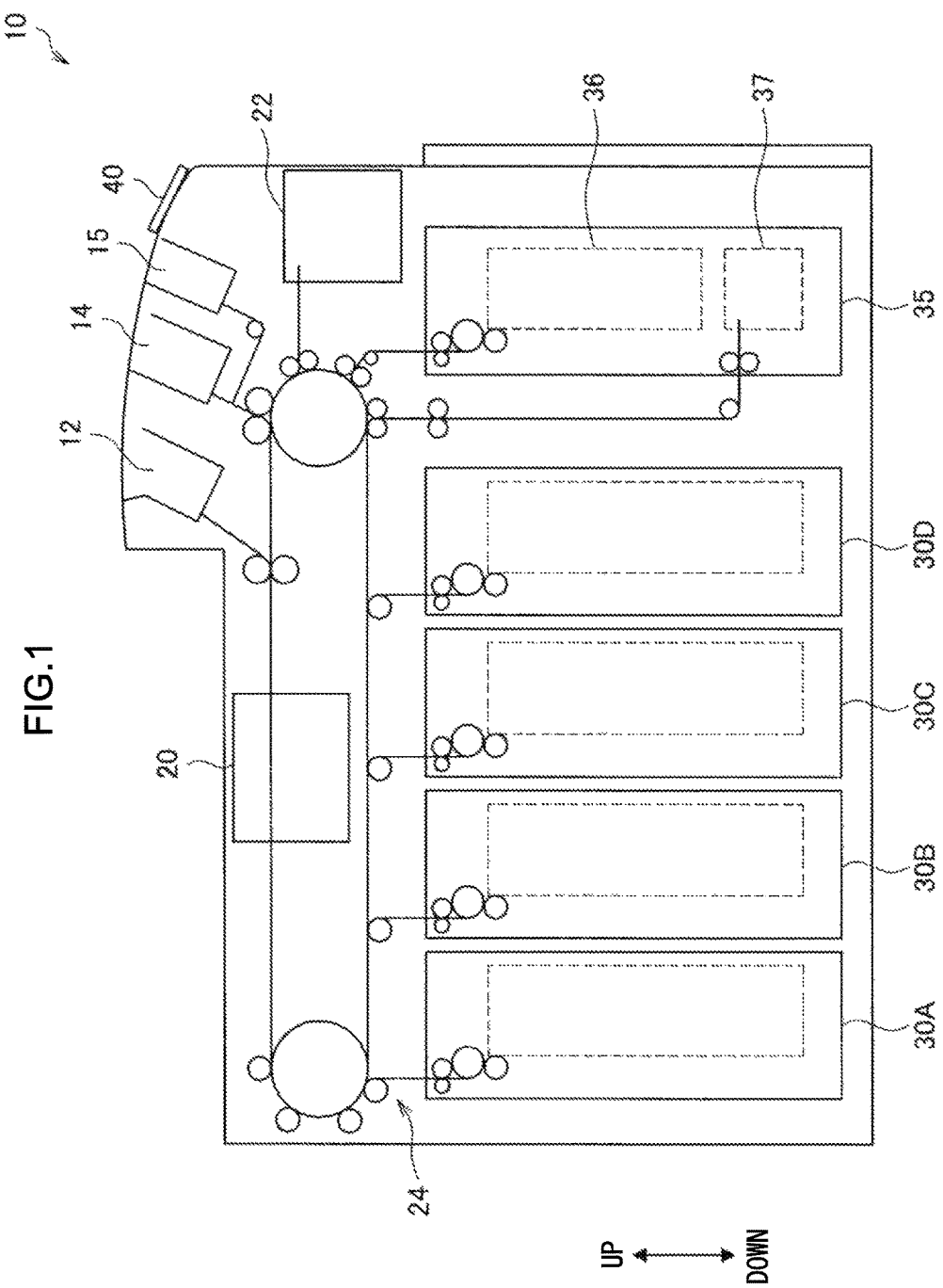

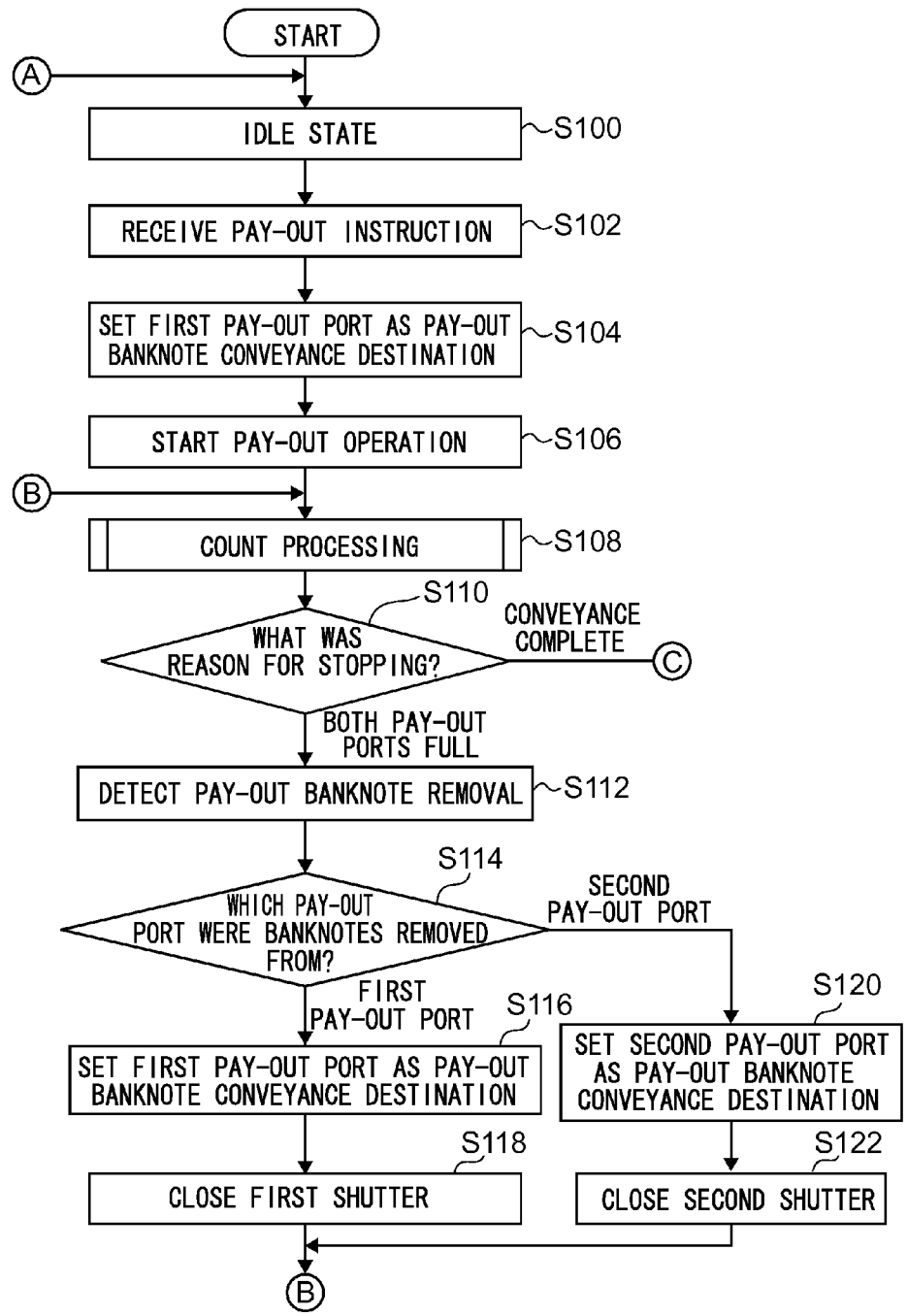

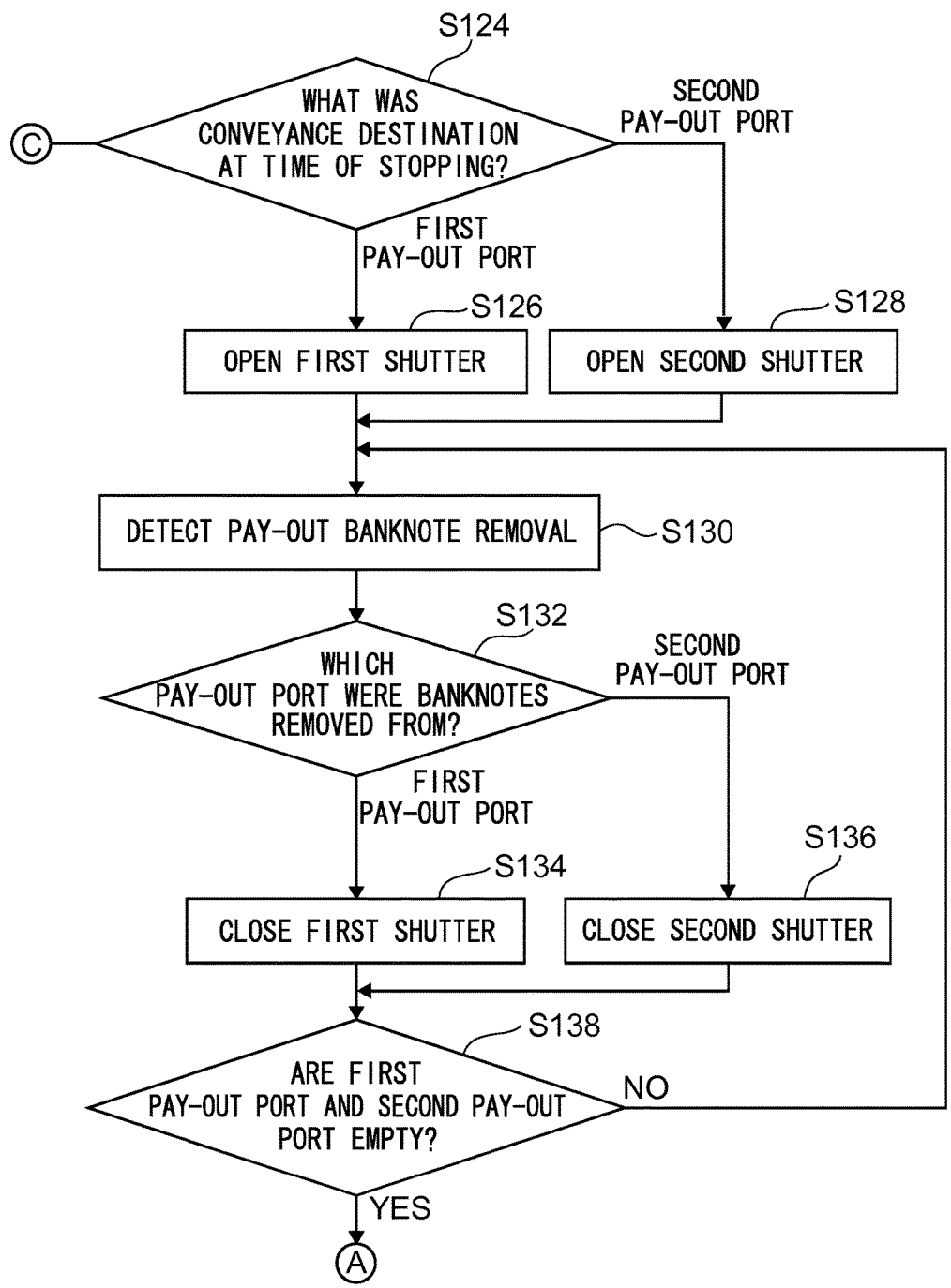

BANKNOTE PROCESSING DEVICE, AND BANKNOTE PROCESSING METHOD

TECHNICAL FIELD

The present invention relates to a banknote processing device and a banknote processing method.

BACKGROUND ART

Cash processing devices, exemplified by service window cash processing machines, are installed at service counters in branches of financial institutions and the like. Cash processing devices are used in, for example, deposit transactions and withdrawal transactions involving banknotes and coins. A cashier, for example, is able to perform deposit transactions or withdrawal transactions by operating an operation section of the cash processing device, or a reception terminal connected to the cash processing device.

Japanese Patent Application Laid-Open (JP-A) No. 2001-93022 (Patent Document 1) describes a cash processing device that performs pay-in processing to store banknotes inserted into a banknote pay-in port in a stacker after temporarily holding the banknotes in a temporary holding section, and performs pay-out processing to separate banknotes stored in the stacker and convey the banknotes to a banknote pay-out port.

SUMMARY OF INVENTION

Technical Problem

However, sometimes a large quantity of banknotes are paid out in the pay-out processing described above. In such cases, sometimes pay-out processing is stopped partway when there is only one currency pay-out port, such as in the currency processing device of Patent Document 1.

Namely, in cases in which the number of banknotes for pay-out is greater than a maximum stacking number that can be stacked in the currency pay-out port, it is necessary to stop pay-out processing and remove the banknotes stacked in the currency pay-out port when the number of banknotes stacked in the currency pay-out port has reached the maximum stacking number. It therefore takes time for conveyance of the remaining banknotes to the currency pay-out port to be resumed. Since banknote conveyance does not restart until the banknotes have been removed, there is a concern of a drop in efficiency in pay-out processing.

In consideration of the above circumstances, an object of the present invention is to provide a new and improved banknote processing device capable of efficiently paying out a large quantity of banknotes without stopping pay-out processing.

Solution to Problem

In order to address the above issue, an aspect of the present invention provides a banknote processing device including: a first pay-out port and a second pay-out port in which banknotes for pay-out are stacked; a conveyance section that conveys banknotes to the first pay-out port or to the second pay-out port; a first opening-closing member capable of opening and closing the first pay-out port by moving; a second opening-closing member capable of opening and closing the second pay-out port by moving; and a controller that controls conveyance of the banknotes by the conveyance section, and that controls opening and closing operations of the first opening-closing member and the second opening-closing member, wherein in cases in which the number of banknotes stacked in the first pay-out port has reached a maximum stacking number in pay-out processing, the controller performs a switching operation to switch a conveyance destination of the banknotes from the first pay-out port to the second pay-out port, and performs an opening operation to open the first opening-closing member.

According to this banknote processing device, in cases in which the number of stacked banknotes in the first pay-out port has reached the maximum stacking number in pay-out processing, the controller performs the switching operation to switch the banknote conveyance destination from the first pay-out port to the second pay-out port, and performs the opening operation to open the first opening-closing member. The banknotes can accordingly be conveyed to the second pay-out port without stopping pay-out processing even when the number of banknotes stacked in the first pay-out port has reached the maximum stacking number. Opening the first opening-closing member enables the banknotes stacked in the first pay-out port to be removed while the banknotes are being conveyed to the second pay-out port, enabling efficient removal of banknotes during pay-out processing for a large quantity of banknotes.

In the banknote processing device described above, configuration may be made wherein the controller opens the first opening-closing member after switching the conveyance destination from the first pay-out port to the second pay-out port.

In the banknote processing device described above, configuration may be made wherein the banknote processing device further includes a detection section that detects removal of stacked banknotes from the first pay-out port or the second pay-out port, wherein the controller performs a closing operation to close the first opening-closing member in cases in which the banknotes stacked in the first pay-out port have been removed after performing the switching operation and the opening operation.

In the banknote processing device described above, configuration may be made wherein the controller stops conveyance of the banknotes to the first pay-out port and the second pay-out port in cases in which the banknotes stacked in the first pay-out port have not been removed before conveyance of the banknotes to the second pay-out port has been completed.

In the banknote processing device described above, configuration may be made wherein, in cases in which the number of the banknotes stacked in the second pay-out port has reached a maximum stacking number after performing the switching operation and the opening operation: the controller performs a switching operation to switch the conveyance destination from the second pay-out port to the first pay-out port, and performs an opening operation to open the second opening-closing member.

In the banknote processing device described above, configuration may be made wherein the controller switches the conveyance destination from the first pay-out port to the second pay-out port after opening the first opening-closing member.

In the banknote processing device described above, configuration may be made wherein the controller opens the first opening-closing member at the same time as switching the conveyance destination from the first pay-out port to the second pay-out port.

In the banknote processing device described above, configuration may be made wherein the controller compares a number of banknotes to be conveyed after performing the switching operation against a maximum stacking number of the second pay-out port; and varies a timing of an opening operation of the first opening-closing member according to whether or not the number of banknotes is greater than the maximum stacking number.

In the banknote processing device described above, configuration may be made wherein the controller: opens the first opening-closing member and the second opening-closing member at the same time as each other after conveyance of the banknotes to the second pay-out port has been completed in cases in which the number of banknotes is the maximum stacking number or fewer; and opens the first opening-closing member accompanying the switching operation in cases in which the number of banknotes is greater than the maximum stacking number.

In order to address the above issue, another aspect of the present invention provides a banknote processing method for controlling conveyance of banknotes for pay-out to a first pay-out port and a second pay-out port, and controlling opening and closing operations of a first opening-closing member capable of opening and closing the first pay-out port and a second opening-closing member capable of opening and closing the second pay-out port, the banknote processing method including: a step of conveying the banknotes to the first pay-out port; a step of, in cases in which the number of stacked banknotes conveyed to the first pay-out port has reached a maximum stacking number in pay-out processing, performing a switching operation to switch a conveyance destination of the banknotes from the first pay-out port to the second pay-out port and performing an opening operation to open the first opening-closing member; and a step of conveying the banknotes to the second pay-out port after switching.

Advantageous Effects of Invention

According to the present invention described above, a large quantity of banknotes can be paid out efficiently, without stopping pay-out processing.

BRIEF DESCRIPTION OF DRAWINGS

FIG. 1 is a drawing illustrating an example of an internal configuration of a banknote processing device 10 according to a first exemplary embodiment.

FIG. 5A is a flow chart illustrating an example of pay-out processing according to the first exemplary embodiment.

FIG. 5B is a continuation of the flow chart of FIG. 5A.

DESCRIPTION OF EMBODIMENTS

Figure 2A:
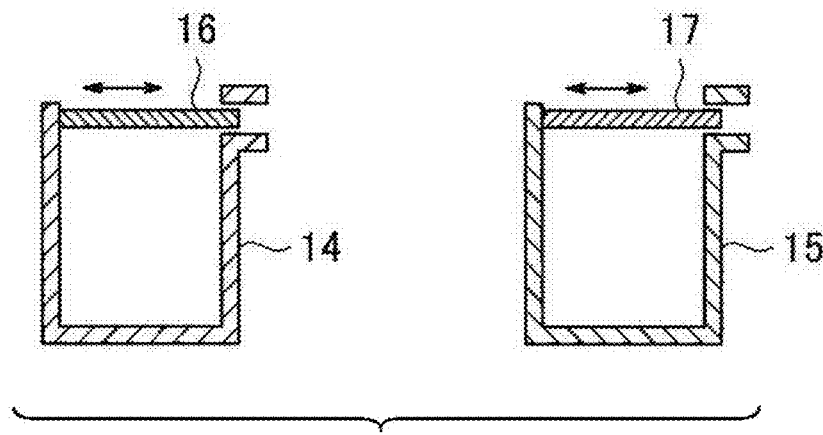
FIG. 2A is a schematic drawing illustrating an example of a configuration of a first shutter 16 and a second shutter 17.

Detailed explanation follows regarding preferable exemplary embodiments of the present invention, with reference to the attached drawings. Note that in the present specification and in the drawings, configuration elements with substantially the same functional configuration are allocated the same reference numerals, and redundant explanation thereof is omitted.

1. First Exemplary Embodiment 1-1. Example of Banknote Processing Device Internal Configuration Explanation follows regarding an example of an internal configuration of a banknote processing device 10 according to a first exemplary embodiment, with reference to FIG. 1.

FIG. 1 illustrates an example of an internal configuration of the banknote processing device 10 according to the first exemplary embodiment. The banknote processing device 10 is installed in a branch of a financial institution or the like. The banknote processing device 10 is a cashier-operated terminal that performs banknote transactions based on operation by a device user, a member of staff such as a service counter cashier at the financial institution.

As illustrated in FIG. 1, the banknote processing device 10 includes a pay-in port 12, a first pay-out port 14, a second pay-out port 15, a banknote identification section 20, a temporary holding section 22, a conveyance section 24, banknote cassettes 30A to 30D, a reject-box installed banknote cassette 35, and a display section 40.

The pay-in port 12 is an insertion port through which the cashier inserts banknotes. The pay-in port 12 may be provided with a shutter (not illustrated in the drawings) that opens and closes an opening portion. The pay-in port 12 includes a separation function for separating and feeding out banknotes that have been inserted in a bundle one note at a time.

The first pay-out port 14 and the second pay-out port 15 are dispensing ports that dispense (pay out) banknotes, which are taken by the cashier. The first pay-out port 14 and the second pay-out port 15 each include a stacking function to stack dispensed banknotes. The first pay-out port 14 and the second pay-out port 15 each include, for example, sufficient capacity to stack 100 banknotes (maximum stacking number). Two pay-out ports are provided in the example illustrated in FIG. 1; however there is no limitation thereto, and, for example, 3 or more pay-out ports may be provided. Note that as illustrated in FIG. 2, a first pay-out port shutter (referred to below as the first shutter) 16 that opens and closes an opening portion of the first pay-out port 14, and a second pay-out port shutter (referred to below as the second shutter) 17 that opens and closes an opening portion of the second pay-out port 15, are respectively provided.

Figure 2B:
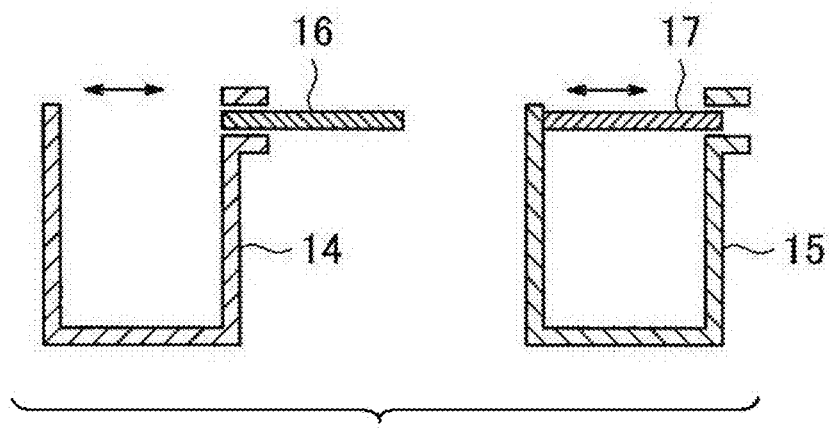
FIG. 2B is another schematic drawing illustrating an example of the configuration of the first shutter 16 and the second shutter 17.

FIGS. 2A and 2B are schematic diagrams illustrating an example of configuration of the first shutter 16 and the second shutter 17. FIG. 2A illustrates a closed state of the first shutter 16 and the second shutter 17, and FIG. 2B illustrates an open state of the first shutter 16. The first shutter 16 and the second shutter 17 respectively move in order to close the first pay-out port 14 and the second pay-out port 15. Note that the first shutter 16 is closed during conveyance of banknotes to the first pay-out port 14, and the second shutter 17 is closed during conveyance of banknotes to the second pay-out port 15. Note that in FIGS. 2A and 2B, the flat plane shaped first shutter 16 and second shutter 17 are opened and closed by sliding, however curved plane shaped shutters may be opened and closed by turning.

The banknote identification section 20 classifies passing banknotes one note at a time. The banknote identification section 20 accommodates banknotes travelling in both directions, such that the banknote identification section 20 can classify banknotes being conveyed from the pay-in port 12 side, and also banknotes being conveyed in the opposite direction. Specifically, the banknote identification section 20 classifies a conveyed banknote passing along a conveyance path by denomination, authenticity (genuine note/counterfeit note), physical condition (good condition note/damaged note), traveling state (normal/abnormal) and the like, conferring a normal determination or a reject determination on the passing banknote.

In the present specification, a genuine note means a note that has been classified as a banknote, and a counterfeit note means one that has not been classified as a banknote. Out of banknotes classified as genuine notes, a good condition note means one that has been classified as suitable for pay-in/pay-out. Out of banknotes classified as genuine notes, a damaged note means one that has been classified as unsuitable for pay-in/pay-out. Reject determination is made based on factors such as authenticity, physical condition (for example dirt, damage, abnormal external profile), and traveling abnormalities (for example skewed banknotes, overlapping travel). Reject banknotes may also include banknotes that are not used in pay-out (such as 2000 yen notes or 5000 yen notes), or foreign currency banknotes.

The temporary holding section 22 has both a banknote separating and a banknote stacking function. In a pay-in transaction, for example, the temporary holding section 22 temporarily stacks banknotes that have been separated out from the pay-in port 12 and classified as normal by the banknote identification section 20. Banknotes stacked in the temporary holding section 22 are fed out on successful completion of a transaction, for example when the paid-in banknotes have been confirmed in the account, and are conveyed through the banknote identification section 20 to, for example, the banknote cassettes 30A to 30D. Note that the temporary holding section 22 may be a stacking type that sequentially stacks banknotes one on top of the other, or may be a drum type that stores banknotes by sequential winding.

The conveyance section 24 includes conveyance paths, conveyance rollers that convey banknotes, and a drive mechanism for driving the respective conveyance rollers, and conveys banknotes one note at a time. The drive mechanism drives the conveyance rollers by rotation of a DC servomotor or a pulse motor, for example. The conveyance section 24 is controlled by a controller, described later, to convey a banknote to its conveyance destination (for example, the first pay-out port 14 or the second pay-out port 15).

The banknote cassettes 30A to 30D are banknote storage sections capable of storing banknotes by denomination, and include both a banknote stacking function and separating function. The banknote cassettes 30A to 30D may include plural banknote cassettes for a single denomination. For example, the banknote cassettes 30A and 30C may be banknote cassettes for 10,000 yen notes, and the banknote cassettes 30B and 30D may be banknote cassettes for 1000 yen notes. The respective banknote cassettes 30A to 30D may be configured with a structure detachable from the banknote processing device 10, enabling individual exchange of the banknote cassettes 30A to 30D to load banknotes into the banknote cassettes 30A to 30D.

The reject box-installed banknote cassette 35 (also referred to below as banknote cassette 35) has a structure detachable from the banknote processing device 10, enabling banknotes to be retrieved and replenished by individually exchanging the banknote cassette 35. The banknote cassette 35 is equipped with a banknote storage box 36 at the upper side, and a reject box 37 at the lower side (bottom portion).

The banknote storage box 36 has a stacking function for stacking banknotes and a separating function for feeding banknotes out one note at a time. The banknote storage box 36 is capable of stacking banknotes that have been separated from each of the banknote cassettes 30A to 30D during cassette counted retrieval, and retrieving banknotes. In cassette counted replenishment, the banknote storage box 36 feeds out banknotes that have been stacked in the banknote storage box 36, enabling replenishment of banknotes in the banknote cassettes 30A to 30D.

The reject box 37 has only a stacking function for stacking banknotes. The reject box 37 is a banknote storage section for stacking banknotes (reject banknotes) that the banknote identification section 20 has classified as abnormal (reject determination).

The display section 40 displays a menu screen and a processing result screen. The display section 40 is, for example, implemented by a Cathode Ray Tube (CRT) display device, a Liquid Crystal Display (LCD) device, or an Organic Light Emitting Diode (OLED) device.

The banknote processing device 10 includes an operation section (not illustrated in the drawings) that can be operated by the cashier. The banknote processing device 10 performs pay-in processing and pay-out processing corresponding to pay-in transactions and pay-out transactions based on operation of the operation section by the cashier. Note that instead of the operation section, the banknote processing device 10 may perform processing based on cashier operation of a reception terminal connected to the banknote processing device 10.

1-2. Banknote Processing Device Basic Processing

As basic processing, the banknote processing device 10 performs, for example, pay-in processing, pay-out processing, replenishment processing, and retrieval processing. In the following explanation, each type of processing is explained with reference to FIG. 1.

Pay-in Processing

Pay-in processing is processing to stack notes from the pay-in port 12 inside the banknote processing device 10. As pay-in processing, the banknote processing device 10 performs, for example, normal pay-in processing in which paid-in banknotes are held back in the temporary holding section 22 and then stacked in the banknote cassettes 30A to 30D from the temporary holding section 22, and direct pay-in processing in which the paid-in banknotes are stacked directly in the banknote cassettes 30A to 30D without being held back in the temporary holding section 22. Note that the banknote processing device 10 is set so as to be capable of selecting normal pay-in processing or direct pay-in processing.

First, explanation is given regarding normal pay-in processing. In normal pay-in processing, banknotes inserted into the pay-in port 12 are first separated and fed out one note at a time, and the fed-out banknotes are conveyed to the banknote identification section 20 by the conveyance section 24. Next, the banknote identification section 20 performs banknote classification, and banknotes given a classification result of normal are conveyed to and stacked in the temporary holding section 22. Then, once the pay-in amount has been confirmed, processing transitions to stacking processing.

However, any banknotes given a classification result of abnormal by the banknote identification section 20 (reject banknotes) are stacked in the first pay-out port 14 or the second pay-out port 15. The cashier may reinsert any banknotes stacked in the first pay-out port 14, or in the second pay-out port 15, into the pay-in port 12 for reclassification by the banknote identification section 20.

In stacking processing, banknotes are first separated from the temporary holding section 22 one note at a time, and the separated banknotes are conveyed to the banknote identification section 20. Banknotes given a classification result of normal by the banknote identification section 20 are stacked in the banknote cassette 30A to 30D for the corresponding denomination. However, any banknotes (reject banknotes) given a classification result of abnormal by the banknote identification section 20, such as dirty notes, folded banknotes, or banknotes travelling abnormally such as skewed banknotes, are stacked in the reject box 37 of the banknote cassette 35.

A transition to return processing is made when pay-in banknote return (cancellation) is instructed prior to approval of a pay-in amount. In return processing, banknotes are first separated from the temporary holding section 22 one note at a time, and the separated banknotes are conveyed to the banknote identification section 20. All of the banknotes are then stacked in the first pay-out port 14 or the second pay-out port 15, regardless of whether the banknote identification section 20 gives a classification result of normal or abnormal.

Next, explanation follows regarding direct pay-in processing. Banknotes inserted into the pay-in port 12 are classified by the banknote identification section 20, similarly to as in normal pay-in processing. Banknotes given a classification result of normal are stacked in the banknote cassette 30A to 30D for the corresponding denomination. However, banknotes given a classification result of abnormal (reject banknotes) are stacked in the first pay-out port 14 or in the second pay-out port 15. The cashier may reinsert any banknotes stacked in the first pay-out port 14, or in the second pay-out port 15, into the pay-in port 12 for reclassification by the banknote identification section 20.

Pay-Out Processing

Pay-out processing is processing in which banknotes in the banknote cassettes 30A to 30D are stacked in the first pay-out port 14 or the second pay-out port 15.

In pay-out processing, banknotes corresponding to a specified amount are first separated and fed out from the banknote cassettes 30A to 30D, one note at a time, and the fed-out banknotes are conveyed by the conveyance section 24 to the banknote identification section 20. Then, the banknote identification section 20 performs banknote classification, and banknotes given a classification result of normal are stacked in the first pay-out port 14 or in the second pay-out port 15. Specifically, banknotes are selectively stacked (accumulated) in the first pay-out port 14 or the second pay-out port 15 according to, for example, the denomination and number of normal banknotes for pay-out. However, banknotes given a classification result of abnormal, namely banknotes that cannot be paid to a customer, are stacked in the reject box 37 of the banknote cassette 35.

Replenishment Processing

Replenishment processing is processing to replenish banknotes in the banknote processing device 10. In the banknote processing device 10, specific possible replenishment methods include pay-in port replenishment, cassette exchange replenishment, and cassette counted replenishment. Explanation follows regarding each replenishment method.

Pay-in port replenishment is similar in operation to the pay-in processing described above. For example, banknotes fed out from the pay-in port 12 and given a classification result of normal by the banknote identification section 20 are held back in the temporary holding section 22, and then stacked in the banknote cassette 30A to 30D of the corresponding denomination. However, banknotes given a classification result of abnormal are stacked in the first pay-out port 14 or the second pay-out port 15.

Cassette exchange replenishment makes use of the detachability of the banknote cassettes 30A to 30D. Banknotes are replenished by exchanging any of the already-mounted banknote cassettes 30A to 30D for a banknote cassette that has been preloaded with banknotes. Note that in cassette exchange replenishment, an operator must manually record the denomination and number of replenished banknotes.

In cassette counted replenishment, first, the banknote storage box 36 of the banknote cassette 35 is preloaded with banknotes and set in the banknote processing device 10. Banknotes are fed out from the banknote storage box 36 one note at a time, and banknotes given a classification result of normal by the banknote identification section 20 are stacked in the banknote cassette 30A to 30D for the corresponding denomination. However, banknotes given a classification result of abnormal are stacked in the reject box 37. Since count processing is executed by the banknote identification section 20 in cassette counted replenishment, there is no need for an operator to manually record the denomination and number of replenished banknotes.

Retrieval Processing

Retrieval processing is processing to retrieve banknotes from inside the banknote processing device 10. In the banknote processing device 10, specific possible retrieval methods are pay-out port retrieval, cassette exchange retrieval, and cassette counted retrieval. Explanation follows regarding each retrieval method.

Pay-out port retrieval is similar in operation to the pay-out processing described above. For example, banknotes fed out from the retrieval target banknote cassette 30A to 30D and given a classification result of normal by the banknote identification section 20 are stacked in the first pay-out port 14 or the second pay-out port 15. However, banknotes given a classification result of abnormal are stacked in the reject box 37. When this has been performed for all of the banknotes stacked in the retrieval target banknote cassette 30A to 30D, the cashier can retrieve all the banknotes determined to be normal from the first pay-out port 14 or the second pay-out port 15. The cashier can also retrieve banknotes determined to be abnormal from the reject box 37.

In cassette exchange retrieval, banknotes are retrieved by removing a specific cassette out of the banknote cassettes 30A to 30D from the banknote processing device 10. Note that in cassette exchange retrieval, an operator has to take the banknotes out from the removed banknote cassette 30A to 30D and manually count the denomination and number of the retrieved banknotes.

In cassette counted retrieval, banknotes fed out from the retrieval target banknote cassette out of the banknote cassettes 30A to 30D and given a classification result of normal by the banknote identification section 20 are stacked in the banknote storage box 36 of the banknote cassette 35. However, banknotes given a classification result of abnormal are stacked in the reject box 37. Then, the cashier can retrieve the banknotes determined to be normal and the banknotes determined to be abnormal by removing only the banknote cassette 35 from the banknote processing device 10. In cassette counted retrieval, count processing is executed by the banknote identification section 20, and so there is no need for an operator to manually count the denomination and number of retrieved banknotes.

1-3. Issues Arising when Paying-Out Banknotes in Large Quantities

Figure 3:
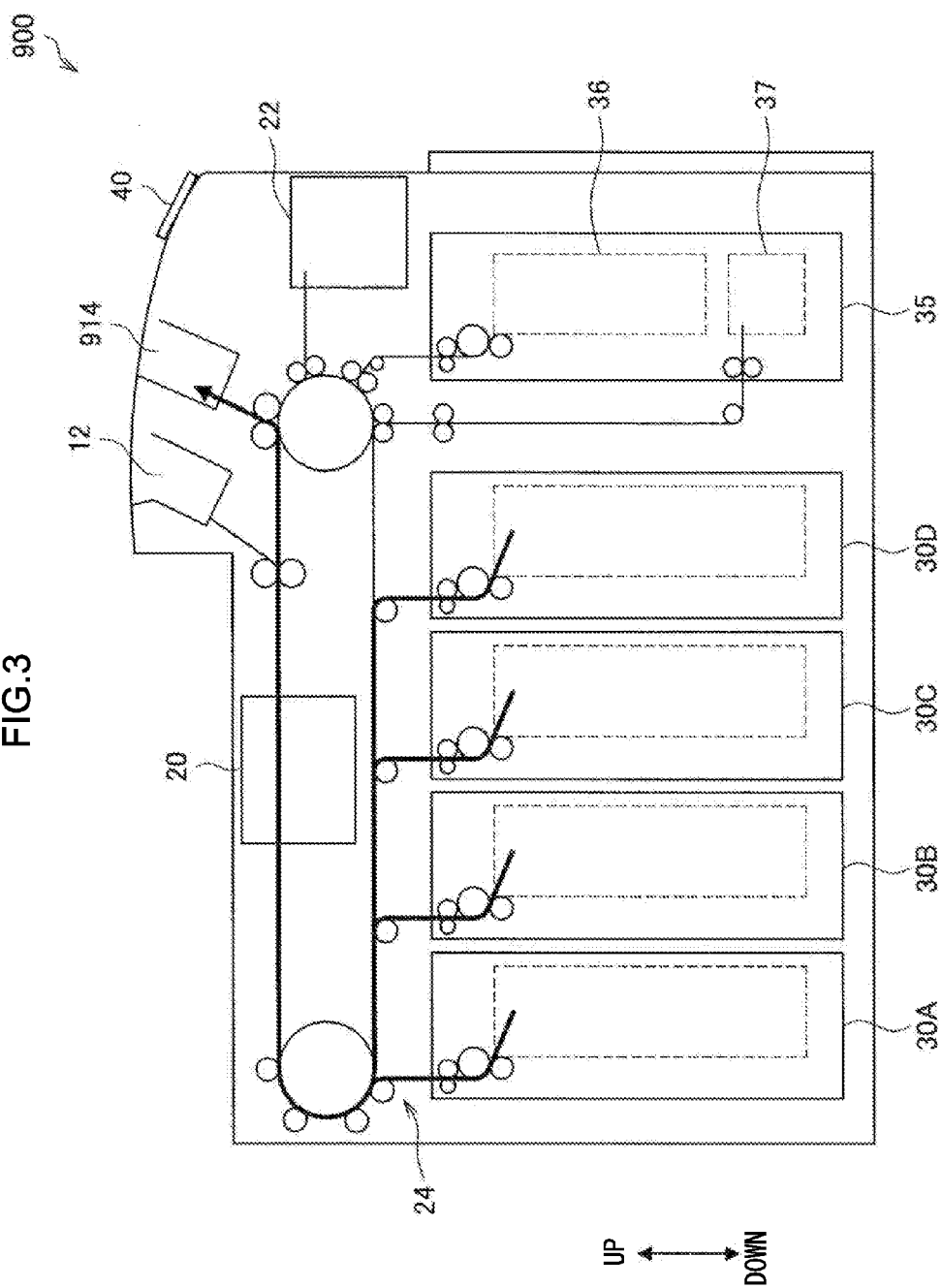
FIG. 3 is a drawing illustrating an example of an internal configuration of a banknote processing device 900 according to a comparative example.

Explanation follows regarding an issue that arises when paying out a large quantity of banknotes, using the example of a banknote processing device 900 of a comparative example illustrated in FIG. 3.

FIG. 3 illustrates an example of an internal configuration of the banknote processing device 900 according to the comparative example. As illustrated in FIG. 3, the banknote processing device 900 only includes a single pay-out port 914, unlike the banknote processing device 10 that includes two pay-out ports (the first pay-out port 14 and the second pay-out port 15). In the banknote processing device 900, sometimes a large quantity of banknotes separated from the banknote cassettes 30A to 30D are paid out from the single pay-out port 914. In such cases, pay-out processing is sometimes stopped partway through.

Normally, there is a limit to the number of banknotes that can be stacked in the pay-out port 914. Accordingly, when the number of banknotes for pay-out exceeds the maximum stacking number of the pay-out port 914, pay-out processing is temporarily stopped when the number of banknotes stacked in the pay-out port 914 reaches the maximum stacking number, and the cashier is required to remove the banknotes stacked in the pay-out port 914. Specifically, pay-out processing is stopped, the shutter of the pay-out port 914 is opened, and the banknotes are removed, and then conveyance of the remaining banknotes to the pay-out port 914 resumes when the shutter has been closed. It therefore takes time for conveyance of the remaining banknotes to the pay-out port 914 to resume. Since banknote conveyance is not resumed until the shutter has closed, there is a concern of a drop in efficiency in pay-out processing.

In contrast, in the banknote processing device 10 according to the first exemplary embodiment, as will be described in detail later, in cases in which the number of banknotes stacked in one pay-out port out of the first pay-out port 14 and the second pay-out port 15 (for convenience, say the first pay-out port) has reached the maximum stacking number during pay-out processing, an operation to switch the banknote conveyance destination from the one pay-out port to the other pay-out port (for convenience, say the second pay-out port), and an operation to open the shutter of the first pay-out port, are performed. This enables conveyance of banknotes to the second pay-out port to continue without stopping pay-out processing, even when the number of banknotes stacked in the first pay-out port has reached the maximum stacking number. Opening the shutter of the first pay-out port (the first shutter 16 or the second shutter 17) enables the banknotes stacked in the first pay-out port to be removed while banknotes are still being conveyed to the second pay-out port, thereby enabling banknotes to be removed efficiently during pay-out processing for a large quantity of banknotes.

1-4. Banknote Processing Device Functional Configuration Example

Figure 4:
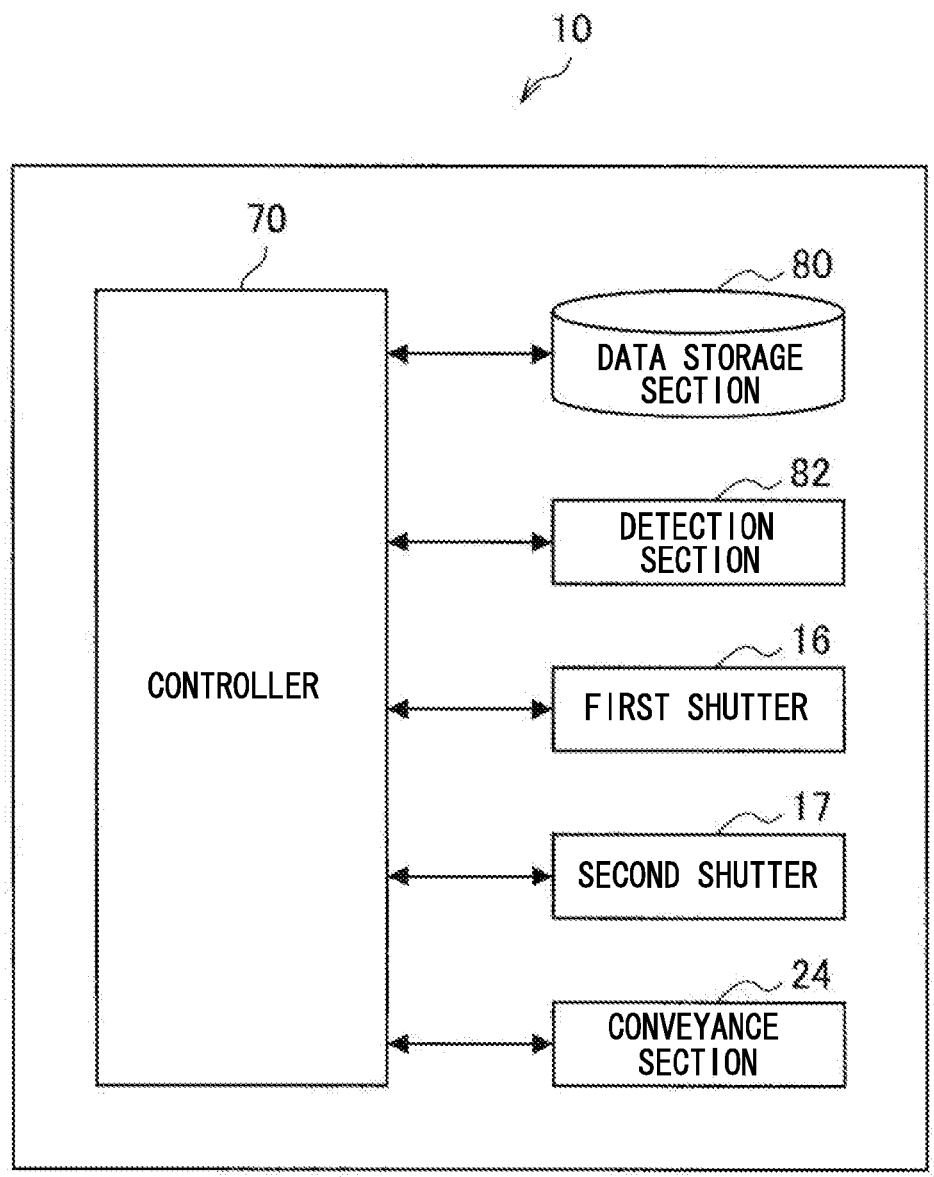
FIG. 4 is a block diagram illustrating an example of a functional configuration of the banknote processing device 10.

Explanation follows regarding an example of a functional configuration of the banknote processing device 10, with reference to FIG. 4. FIG. 4 is a block diagram illustrating an example of the functional configuration of the banknote processing device 10. As illustrated in FIG. 4, the banknote processing device 10 includes a controller 70, a data storage section 80, and a detection section 82.

The controller 70 controls overall operation of the banknote processing device 10. Specifically, the controller 70 controls basic processing such as the pay-in processing, pay-out processing, replenishment processing, and retrieval processing described above. For example, the controller 70 controls conveyance of the banknotes by the conveyance section 24, and opening and closing operations of the first shutter 16 and the second shutter 17.

Note that in the first exemplary embodiment, the controller 70 controls the first shutter 16 and the second shutter 17 as follows in pay-out processing for a large quantity of banknotes. In the following explanation, the first shutter 16 corresponds to a first opening and closing member capable of opening and closing the first pay-out port 14 by moving, and the second shutter 17 corresponds to a second opening and closing member capable of opening and closing the second pay-out port 15 by moving. In pay-out processing, banknotes are initially conveyed to the first pay-out port 14 out of the first pay-out port 14 and the second pay-out port 15.

In cases in which the number of stacked banknotes in the first pay-out port 14 reaches the maximum stacking number (100 notes) during pay-out processing, the controller 70 performs a switching operation to switch the banknote conveyance destination from the first pay-out port 14 to the second pay-out port 15, and an opening operation to open the first shutter 16. Specifically, in cases in which the number of stacked banknotes in the first pay-out port 14 has reached the maximum stacking number, the controller 70 switches the banknote conveyance destination from the first pay-out port 14 to the second pay-out port 15, and then opens the first shutter 16. Note that the conveyance section 24 includes a member such as a switching blade on the conveyance path, and the conveyance destination can be set to the first pay-out port 14 or the second pay-out port 15 by, for example, turning the switching blade.

The banknotes can accordingly be conveyed to the second pay-out port 15 without stopping pay-out processing, even when the number of stacked banknotes in the first pay-out port 14 has reached the maximum stacking number. Opening the first shutter 16 after switching the conveyance destination enables the banknotes stacked in the first pay-out port 14 to be removed while the banknotes are still being conveyed to the second pay-out port 15, enabling efficient removal of banknotes during pay-out processing for a large quantity of banknotes.

In the above explanation, the controller 70 opens the first shutter 16 after the banknote conveyance destination has been switched from the first pay-out port 14 to the second pay-out port 15, however there is no limitation thereto. For example, the controller 70 may switch the conveyance destination from the first pay-out port 14 to the second pay-out port 15 after opening the first shutter 16. Alternatively, the controller 70 may open the first shutter 16 at the same time as switching the conveyance destination from the first pay-out port 14 to the second pay-out port 15. In such cases, pay-out processing for a large quantity of banknotes can be performed without stopping pay-out processing. Since the timing for opening the first shutter 16 can be brought forward, the cashier can remove the banknotes stacked in the first pay-out port 14 more easily while banknotes are being conveyed to the second pay-out port 15.

After performing the conveyance destination switching operation and the first shutter 16 opening operation, the controller 70 also performs a closing operation to close the first shutter 16 when the banknotes stacked in the first pay-out port 14 have been removed. This enables banknotes subsequently stacked in the first pay-out port 14 to be prevented from flying out due to leaving the first shutter 16 open. Operation noise of the banknote processing device 10 and the like can also be suppressed from escaping to the outside through the first pay-out port 14.

The controller 70 stops the conveyance of banknotes to the first pay-out port 14 and the second pay-out port 15 if the banknotes stacked in the first pay-out port 14 are not removed before completion of banknote conveyance to the second pay-out port 15. Banknote jams and the like can accordingly be prevented from occurring inside the banknote processing device 10.

After performing the conveyance destination switching operation and the opening operation of the first shutter 16, the controller 70 further performs a switching operation to switch the conveyance destination from the second pay-out port 15 to the first pay-out port 14, and an opening operation to open the second shutter 17, in cases in which the number of banknotes stacked in the second pay-out port 15 has reached the maximum stacking number (100 notes). Since the banknote conveyance destination is switched alternately between the first pay-out port 14 and the second pay-out port 15, there is no need to stop pay-out processing, even when paying out a number of notes that cannot all be stacked in the second pay-out port 15, since banknotes are conveyed to the first pay-out port 14 from which the cashier has already removed banknotes. Opening the second shutter 17 enables the banknotes stacked in the second pay-out port 15 to be removed while banknotes are being conveyed to the first pay-out port 14.

The data storage section 80 is stored with a program for operating the banknote processing device 10 and the like. The data storage section 80 may also be stored with classification results of the banknote identification section 20.

The detection section 82 includes, for example, optical sensors, and detects various states. For example, the detection section 82 detects a stacking state (number of stacked banknotes, whether or not banknotes have been removed) of banknotes in the first pay-out port 14 or the second pay-out port 15. The detection section 82 may also detect a banknote conveyance state.

Note that the functions of the controller 70 and the data storage section 80 described above may be implemented by a hardware configuration including a Central Processing Unit (CPU), Read Only Memory (ROM), Random Access Memory (RAM) and the like. The CPU includes a computing function and a control function, and controls overall operation of the banknote processing device 10 with various programs. The ROM stores programs, computation parameters, and the like employed by the CPU. The RAM temporarily stores programs employed in execution by the CPU, appropriately modified parameters employed in such execution, and the like.

1-5. Pay-Out Processing Example

Explanation follows regarding an example of pay-out processing according to the first exemplary embodiment, with reference to FIGS. 5A to 7E. FIGS. 5A and 5B are a flow chart illustrating an example of pay-out processing according to a first exemplary embodiment. FIGS. 6A and 6B are a flow chart illustrating an example of pay-out banknote count processing according to the first exemplary embodiment. FIGS. 7A to 7E illustrate open and closed states of the first shutter 16 and the second shutter 17 during pay-out processing.

The flow chart in FIGS. 5A and 5B is, for example, realized by the CPU of the controller 70 executing a program stored in the ROM. Note that the executed program may be stored on a storage medium such as a Compact Disk (CD), a Digital Versatile Disk (DVD), or a memory card, or may be downloaded from a server or the like using the internet.

The flow chart in FIG. 5A starts in an idle state of pay-out processing, namely a state in which the first shutter 16 of the first pay-out port 14 and the second shutter 17 of the second pay-out port 15 are closed (step S100). In the idle state, the controller 70 receives a pay-out processing instruction from an operation section of the banknote processing device 10 operated by the cashier, or from a reception terminal connected to the banknote processing device 10 (step S102). Here, the controller 70 receives data of the banknote cassette (s) to be employed in pay-out and the number of notes to be paid out.

Next, the controller 70 sets the pay-out banknote conveyance destination to either the first pay-out port 14 or the second pay-out port 15 (step S104). In the present explanation, the conveyance destination is set to the first pay-out port 14, however the second pay-out port 15 may be set. Next, the controller 70 starts pay-out operation as instructed (step S106). Next, the controller 70 performs count processing of the pay-out banknotes, as illustrated in FIGS. 6A and 6B (step S108).

Figure 6A:
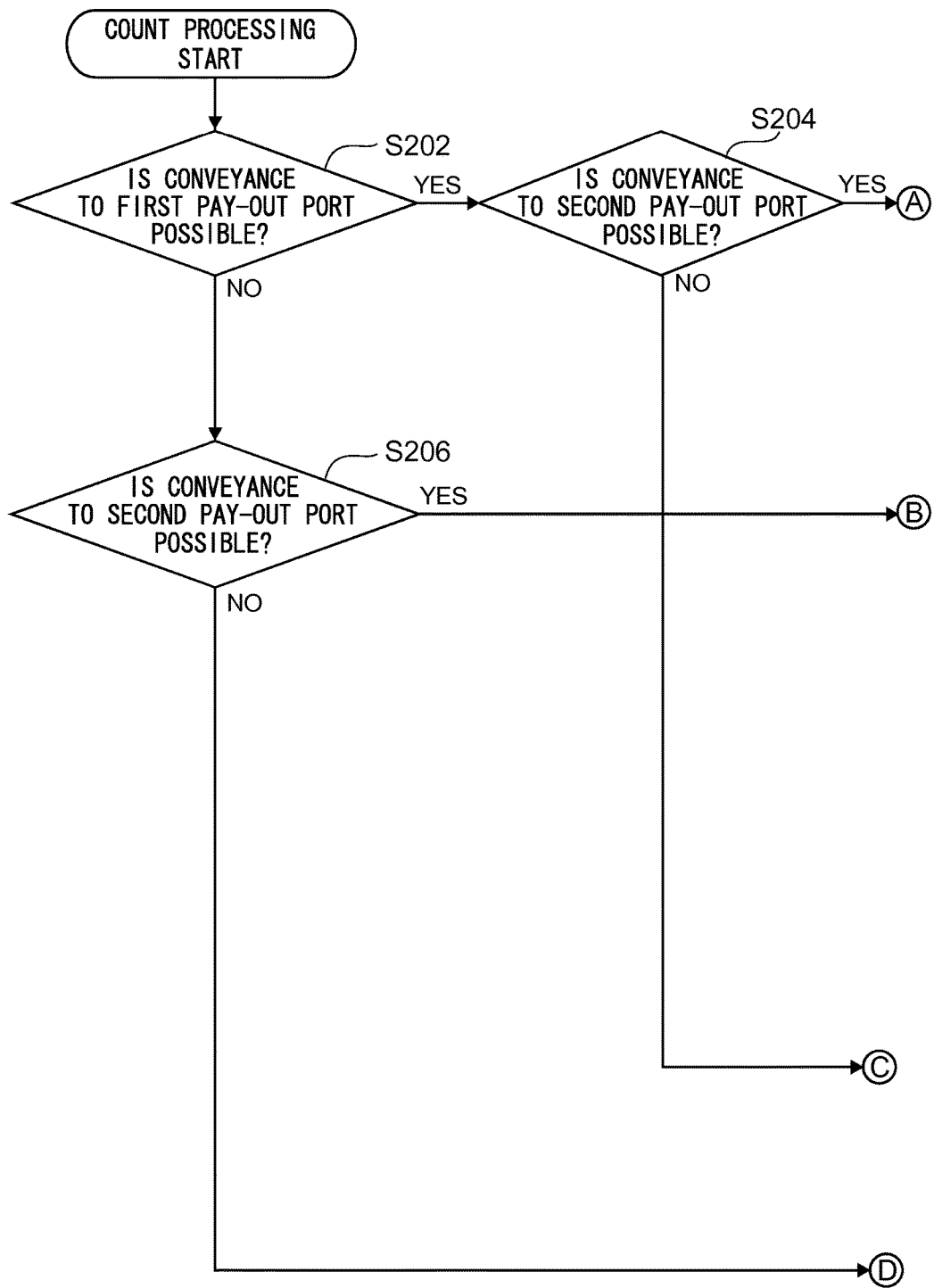
FIG. 6A is a flow chart illustrating an example of count processing of pay-out banknotes according to the first exemplary embodiment.
Figure 6B:
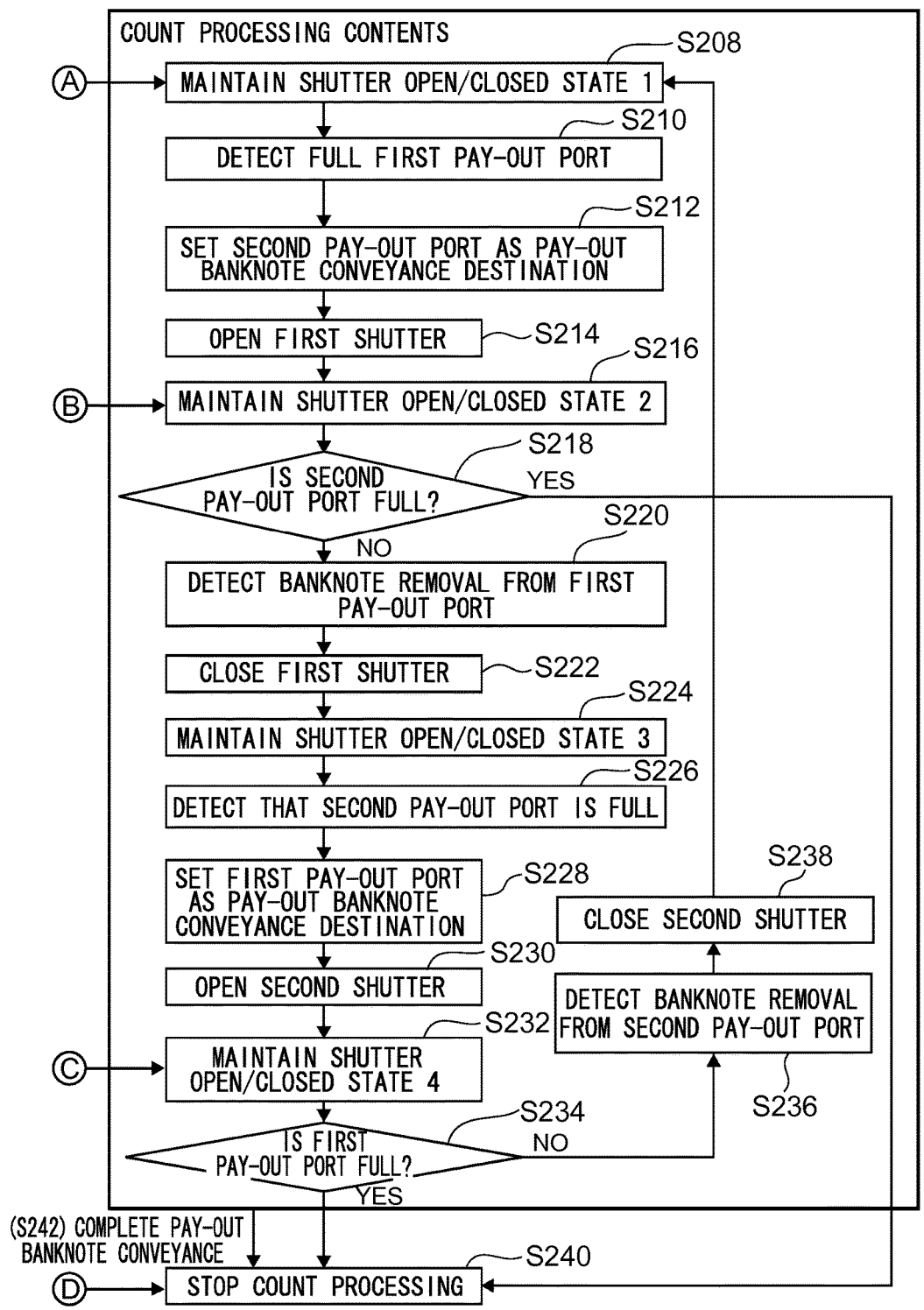
FIG. 6B is a continuation of the flow chart of FIG. 6A.
Figure 7A:
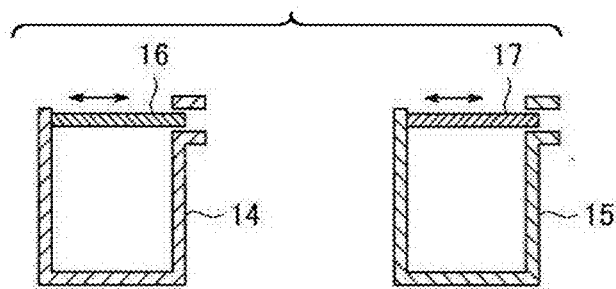
FIG. 7A is a diagram to explain open and closed states of the first shutter 16 and the second shutter 17 in pay-out processing.

In the flow chart in FIG. 6A, the controller 70 first determines whether or not the pay-out banknotes can be conveyed to the first pay-out port 14 and the second pay-out port 15 (steps S202, S204, S206). Then, in FIG. 6B, if the pay-out banknotes can be conveyed to the first pay-out port 14 and the second pay-out port 15 (step S202: Yes, S204: Yes), as illustrated in FIG. 7A the controller 70 maintains a shutter open/closed state 1 in which the first shutter 16 and the second shutter 17 are closed (step S208). Namely, the same state is maintained as when pay-out processing was started.

In the shutter open/closed state 1, the controller 70 conveys the pay-out banknotes fed out from the banknote cassette to the banknote identification section 20, and pay-out banknotes with a classification result of normal are conveyed to the first pay-out port 14. Then, say the detection section 82 detects that the maximum stacking number (100 notes) of pay-out banknotes are stacked in the first pay-out port 14 (detects that the first pay-out port 14 is Full) (step 210). The controller 70 then switches the pay-out banknote conveyance destination from the first pay-out port 14 to the second pay-out port 15 (step S212). For example, the controller 70 turns the switching blade to switch the conveyance destination, without stopping banknote conveyance. The pay-out banknotes are thus conveyed to the second pay-out port 15.

Figure 7B:
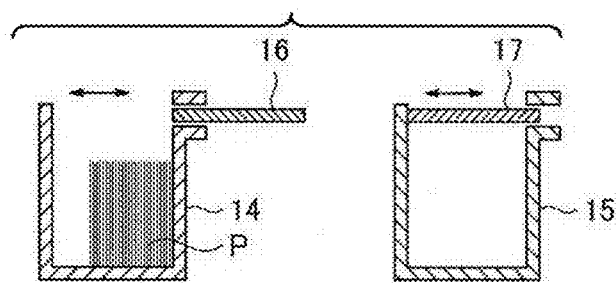
FIG. 7B is another diagram to explain open and closed states of the first shutter 16 and the second shutter 17 in pay-out processing.

Next, as illustrated in FIG. 7B, the controller 70 opens the first shutter 16 of the first pay-out port 14 in which pay-out banknotes P are stacked (step S214). The controller 70 then maintains a shutter open/closed state 2 state in which the first shutter 16 is open and the second shutter 17 is closed (step S216). When this is performed, since the first shutter 16 is open, the cashier is able to remove the pay-out banknotes P stacked in the first pay-out port 14.

In the shutter open/closed state 2, the pay-out banknotes are conveyed to the second pay-out port 15. The controller 70 then determines whether or not the maximum stacking number (100 notes) have been stacked in the second pay-out port 15 (the second pay-out port 15 is Full) prior to removal of the pay-out banknotes from the first pay-out port 14 (step S218). If the second pay-out port 15 is Full at step S218 (Yes), the pay-out banknotes cannot be conveyed to the first pay-out port 14 or the second pay-out port 15, and the controller 70 stops count processing (S240).

Figure 7C:
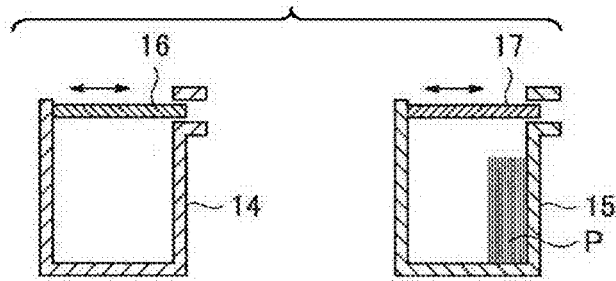
FIG. 7C is another diagram to explain open and closed states of the first shutter 16 and the second shutter 17 in pay-out processing.

However, if the detection section 82 detects that the pay-out banknotes stacked in the first pay-out port 14 have been removed (step S220) before the second pay-out port 15 becomes Full (step S218: No), as illustrated in FIG. 7C, the controller 70 closes the first shutter 16 of the first pay-out port 14 from which the pay-out banknotes have been removed (step S222). Then, the controller 70 maintains a shutter open/closed state 3 in which the first shutter 16 and the second shutter 17 are closed (step S224). When this is performed, the pay-out banknotes are conveyed to the second pay-out port 15.

If the controller 70 detects that the second pay-out port 15 has become Full in the shutter open/closed state 3 (step S226), the controller 70 then switches the pay-out banknote conveyance destination from the second pay-out port 15 to the first pay-out port 14 (step S228). The pay-out banknotes are accordingly conveyed to the first pay-out port 14.

Figure 7D:
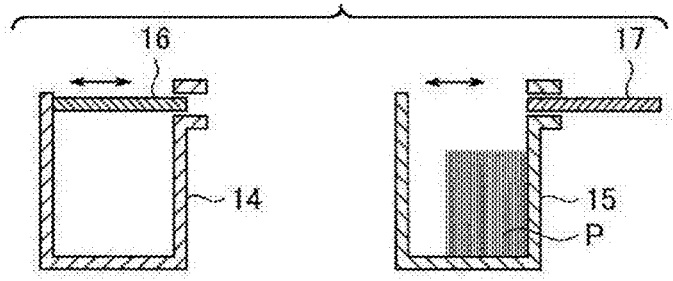
FIG. 7D is another diagram to explain open and closed states of the first shutter 16 and the second shutter 17 in pay-out processing.

Next, as illustrated in FIG. 7D, the controller 70 opens the second shutter 17 of the second pay-out port 15 in which the pay-out banknotes P are stacked (step S230). The controller 70 then maintains a shutter open/closed state 4 in which the first shutter 16 is closed and the second shutter 17 is open (step S232). When this is performed, since the second shutter 17 is open, the cashier is able to remove the pay-out banknotes P stacked in the second pay-out port 15.

Figure 7E:
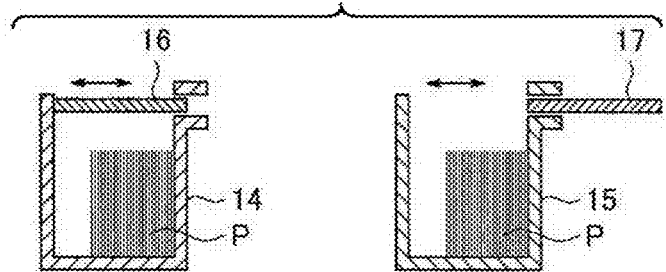
FIG. 7E is another diagram to explain open and closed states of the first shutter 16 and the second shutter 17 in pay-out processing.

The pay-out banknotes are conveyed to the first pay-out port 14 while the shutter open/closed state 4 is being maintained. The controller 70 then determines whether or not the first pay-out port 14 has become Full prior to removal of the pay-out banknotes stacked in the second pay-out port 15 (step S234). If the first pay-out port 14 is Full at step S234 (Yes), namely, if both the first pay-out port 14 and the second pay-out port 15 are Full, as illustrated in FIG. 7E, pay-out banknote conveyance cannot be performed and the controller 70 stops count processing (S240).

However, if the detection section 82 detects that the pay-out banknotes stacked in the second pay-out port 15 have been removed (step S236) before the first pay-out port 14 becomes Full (step S234: No), the controller 79 closes the second shutter 17 of the second pay-out port 15 from which the pay-out banknotes have been removed (step S238). The controller 70 then maintains the shutter open/closed state 1 in which the first shutter 16 and the second shutter 17 are closed (step S208).

Then, when conveyance of the pay-out banknotes to the first pay-out port 14 and the second pay-out port 15 has been completed (step S242), the controller 70 stops count processing (step S240).

The processing of the flow chart in FIGS. 6A and 6B is repeated until count processing is stopped. When count processing is stopped, processing returns to the flow chart in FIG. 5A, and pay-out processing continues. Namely, when the count processing at step S108 is stopped, the controller 70 determines the reason for stopping conveyance of the pay-out banknotes (step S110). The reasons for stopping referred to here are that both the first pay-out port 14 and the second pay-out port 15 are Full, or that pay-out banknote conveyance has been completed.

If the reason for stopping at step S110 is that both the first pay-out port 14 and the second pay-out port 15 are Full, the controller 70 detects for removal of the pay-out banknotes (step S112). When this is performed, the first shutter 16 and the second shutter 17 are opened. The controller 70 determines whether or not the banknotes stacked in either the first pay-out port 14 or the second pay-out port 15 have been removed (step S114).

In cases in which the pay-out banknotes have been removed from the first pay-out port 14 at step S110, conveyance of pay-out banknotes to the first pay-out port 14 is possible, and so the controller 70 sets the first pay-out port 14 as the pay-out banknote conveyance destination (step S116), and closes the first shutter 16 (step S118). The controller 70 then resumes count processing (step 108). In such a case, the shutter open/closed state 4 of step S232 in the flow chart in FIG. 6B is adopted.

However, in cases in which the pay-out banknotes have been removed from the second pay-out port 15 at step S114, conveyance of pay-out banknotes to the second pay-out port 15 is possible, and so the controller 70 sets the second pay-out port 15 as the pay-out banknote conveyance destination (step S120), and closes the second shutter 17 (step S122). The controller 70 then resumes count processing (step 108). In such a case, the shutter open/closed state 2 of step S216 in the flow chart in FIG. 6B is adopted.

If the reason for stopping at step S110 is that pay-out banknote conveyance has been completed, the controller 70 determines whether the pay-out banknote conveyance destination was the first pay-out port 14 or the second pay-out port 15 when count processing was stopped (step S124). In cases in which the conveyance destination at step S124 was the first pay-out port 14, the controller 70 opens the first shutter 16 to allow removal of the pay-out banknotes in the first pay-out port 14 (step S126). However, in cases in which the conveyance destination at step S124 was the second pay-out port 15, the controller 70 opens the second shutter 17 to allow removal of the pay-out banknotes in the second pay-out port 15 (step S128).

Next, the controller 70 detects for pay-out banknote removal (step S130). At this point, either the first shutter 16 or the second shutter 17 is open. The controller 70 determines whether or not the pay-out banknotes stacked in either the first pay-out port 14 or the second pay-out port 15 have been removed (step S132).

When the pay-out banknotes have been removed from the first pay-out port 14 at step S132, the controller 70 closes the open first shutter 16 (step S134). However, when the pay-out banknotes have been removed from the second pay-out port 15 at step S132, the controller 70 closes the open second shutter 17 (step S136).

Next, the controller 70 determines whether or not no pay-out banknotes are stacked in both the first pay-out port 14 and the second pay-out port 15 (the first pay-out port 14 and the second pay-out port 15 are Empty) (step S138). If the first pay-out port 14 and the second pay-out port 15 are not Empty at step S138 (No), namely, if pay-out banknotes that have not been removed are stacked in the pay-out port(s) at step S132, the controller 70 returns to step S130 and detects for pay-out banknote removal again.

However, if the first pay-out port 14 and the second pay-out port are Empty at step S138 (Yes), the controller 70 returns to the idle state of step S100. The pay-out processing routine is thereby completed.

1-6. Advantageous Effects of the First Exemplary Embodiment

According to the first exemplary embodiment described above, in cases in which the number of banknotes stacked in one pay-out port out of the first pay-out port 14 and the second pay-out port 15 reaches the maximum stacking number during pay-out processing (in this explanation, the first pay-out port 14 is used as an example), the switching operation to switch the banknote conveyance destination from the first pay-out port 14 to the second pay-out port 15, and the opening operation to open the first shutter 16 of the first pay-out port 14, are performed.

Banknotes can accordingly continue to be conveyed to the other pay-out port (the second pay-out port 15) without stopping pay-out processing, even when the number of banknotes stacked in the one pay-out port (first pay-out port 14) has reached the maximum stacking number. Moreover, opening the first shutter 16 allows the cashier to remove the banknotes stacked in the first pay-out port 14 while banknotes are being conveyed to the second pay-out port 15, thereby enabling efficient removal of the banknotes during pay-out processing for a large quantity of banknotes. A large quantity of banknotes can accordingly be efficiently paid out without stopping pay-out processing.

Note that in the flow chart in FIGS. 5A and 5B, the controller 70 receives data of the banknote cassette(s) to be employed in pay-out and number of pay-out banknotes, however the controller 70 may also receive data of the pay-out denomination and number of pay-out banknotes.

2. Second Exemplary Embodiment

In the first exemplary embodiment described above, the controller 70 switches the banknote conveyance destination from the first pay-out port 14 to the second pay-out port 15, and opens the first shutter 16 of the first pay-out port 14, when the number of banknotes stacked in the first pay-out port 14 has reached the maximum stacking number.

However, in the second exemplary embodiment, the controller 70 compares the number of banknotes (unpaid banknotes) for conveyance after switching the conveyance destination to the second pay-out port 15 against the maximum stacking number (100 notes) of the second pay-out port 15, and varies a timing of an opening operation of the first shutter 16 according to whether or not the number of banknotes is greater than the maximum stacking number. The first shutter 16 can accordingly be opened at an appropriate timing according to the number of unpaid banknotes for conveyance after performing the switching operation.

Specifically, if the number of banknotes is the maximum stacking number or fewer, the controller 70 opens the first shutter 16 and the second shutter 17 at the same time, after conveyance of the banknotes to the second pay-out port 15 has been completed. However, if the number of banknotes is greater than the maximum stacking number, the controller 70 opens the first shutter 16 accompanying the banknote conveyance destination switching operation. Accordingly, in cases in which the number of banknotes is the maximum stacking number or fewer, opening the first shutter 16 and the second shutter 17 at the same time enables the cashier to confirm that all of the pay-out banknotes have been conveyed to the first pay-out port 14 and the second pay-out port 15, for example. In cases in which the number of banknotes is greater than the maximum stacking number, opening the first shutter 16 accompanying the conveyance destination switching operation facilitates removal of the banknotes stacked in the first pay-out port 14 while banknotes are being conveyed to the second pay-out port 15.

Note that since the configuration of the banknote processing device 10 according to the second exemplary embodiment is similar to that of the first exemplary embodiment, explanation thereof is omitted. Explanation is given below regarding an example of pay-out processing according to the second exemplary embodiment, with reference to FIG. 8A to FIG. 10B.

Figure 8A:
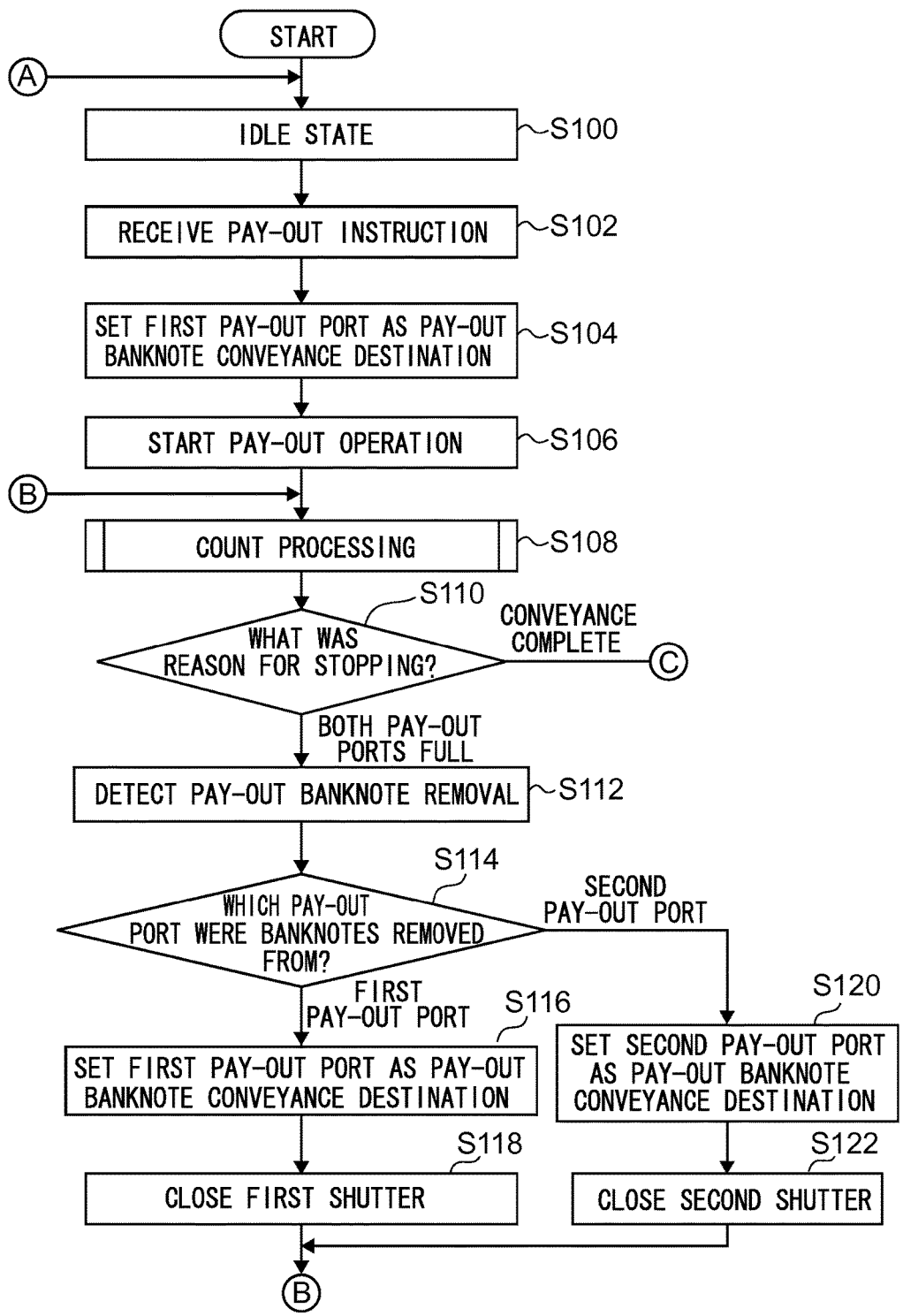
FIG. 8A is a flow chart illustrating an example of pay-out processing according to a second exemplary embodiment.
Figure 8B:
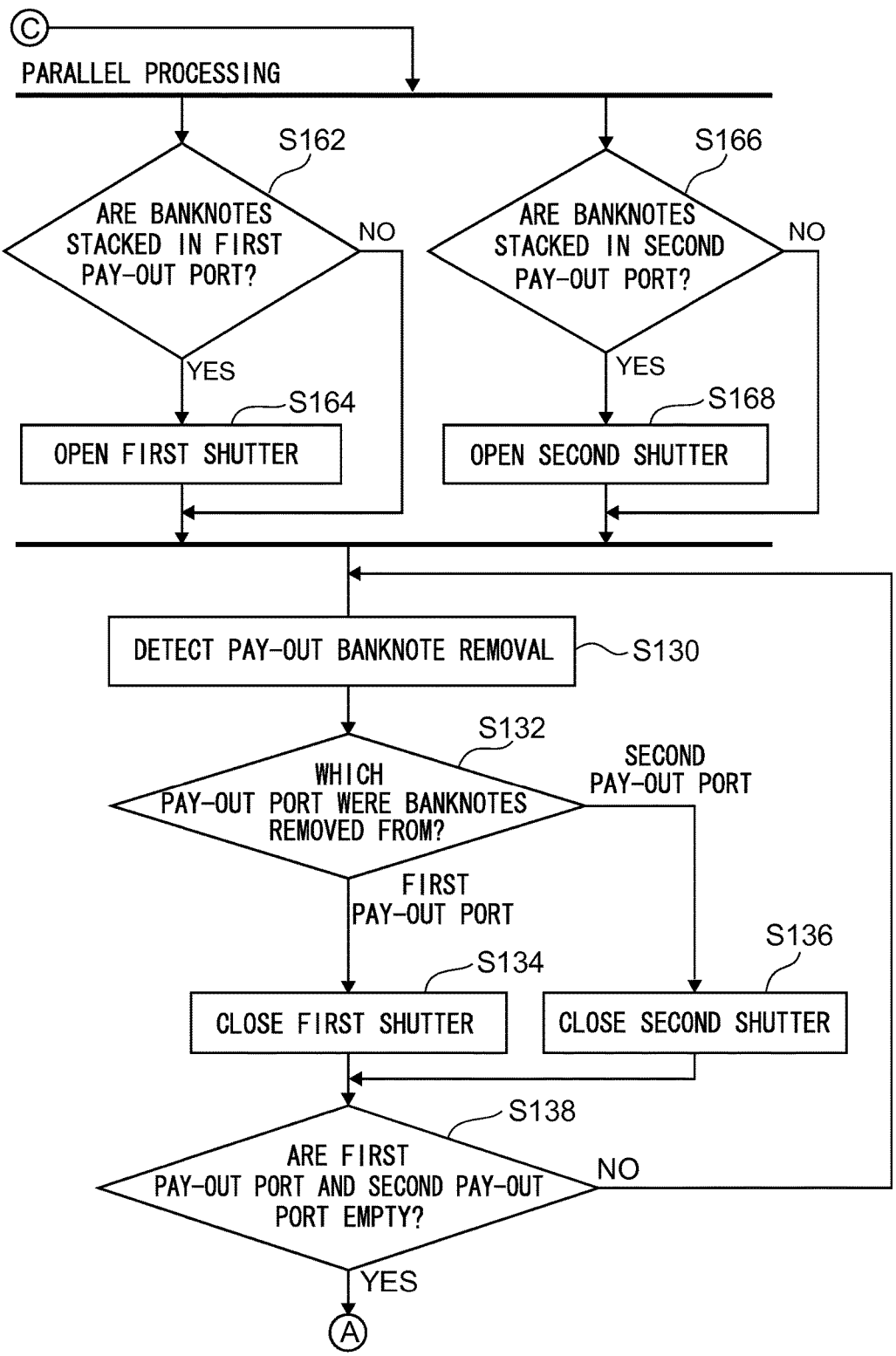
FIG. 8B is a continuation of the flow chart of FIG. 8A.
Figure 9A:
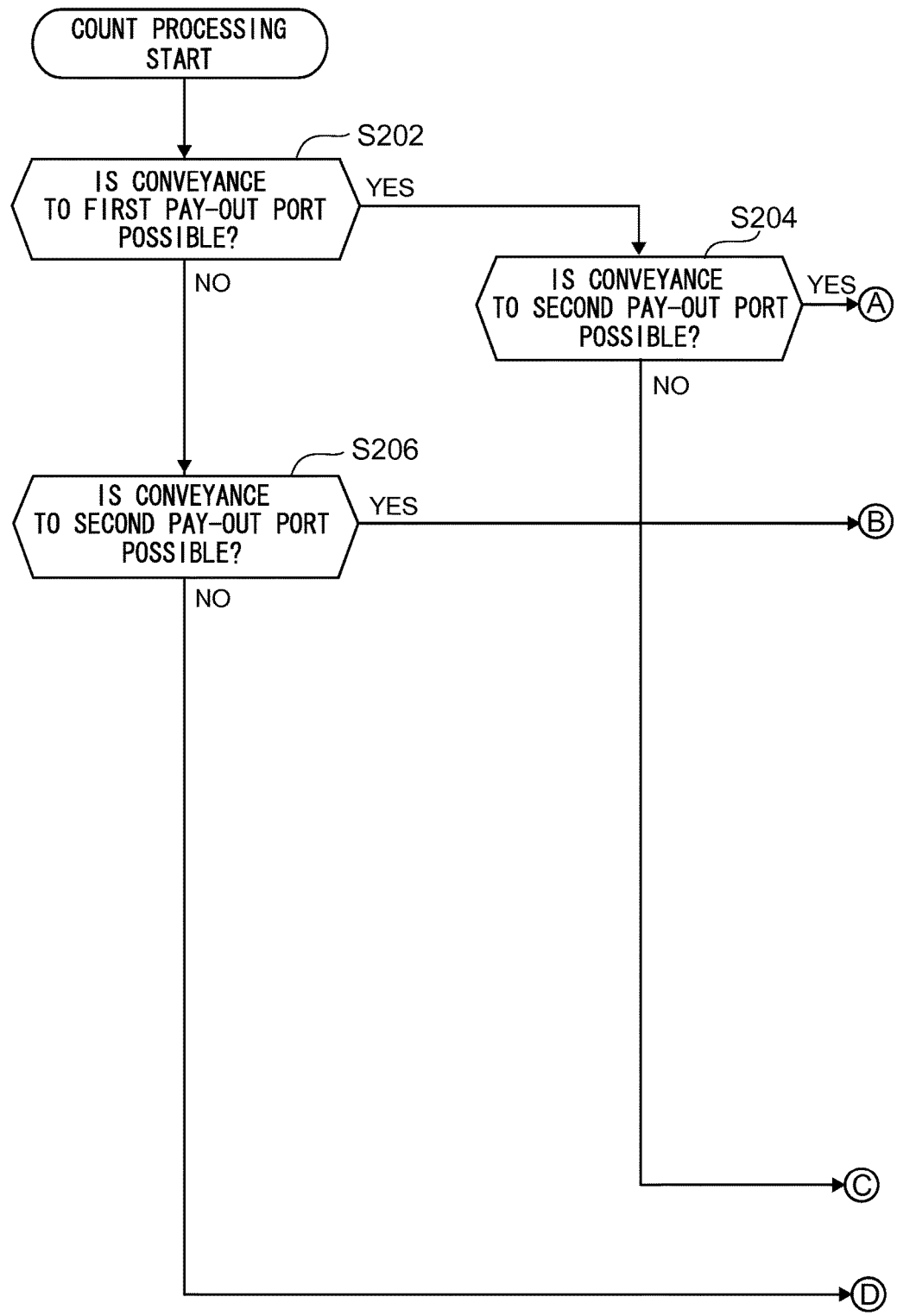
FIG. 9A is a flow chart illustrating an example of count processing according to the second exemplary embodiment.
Figure 9B:
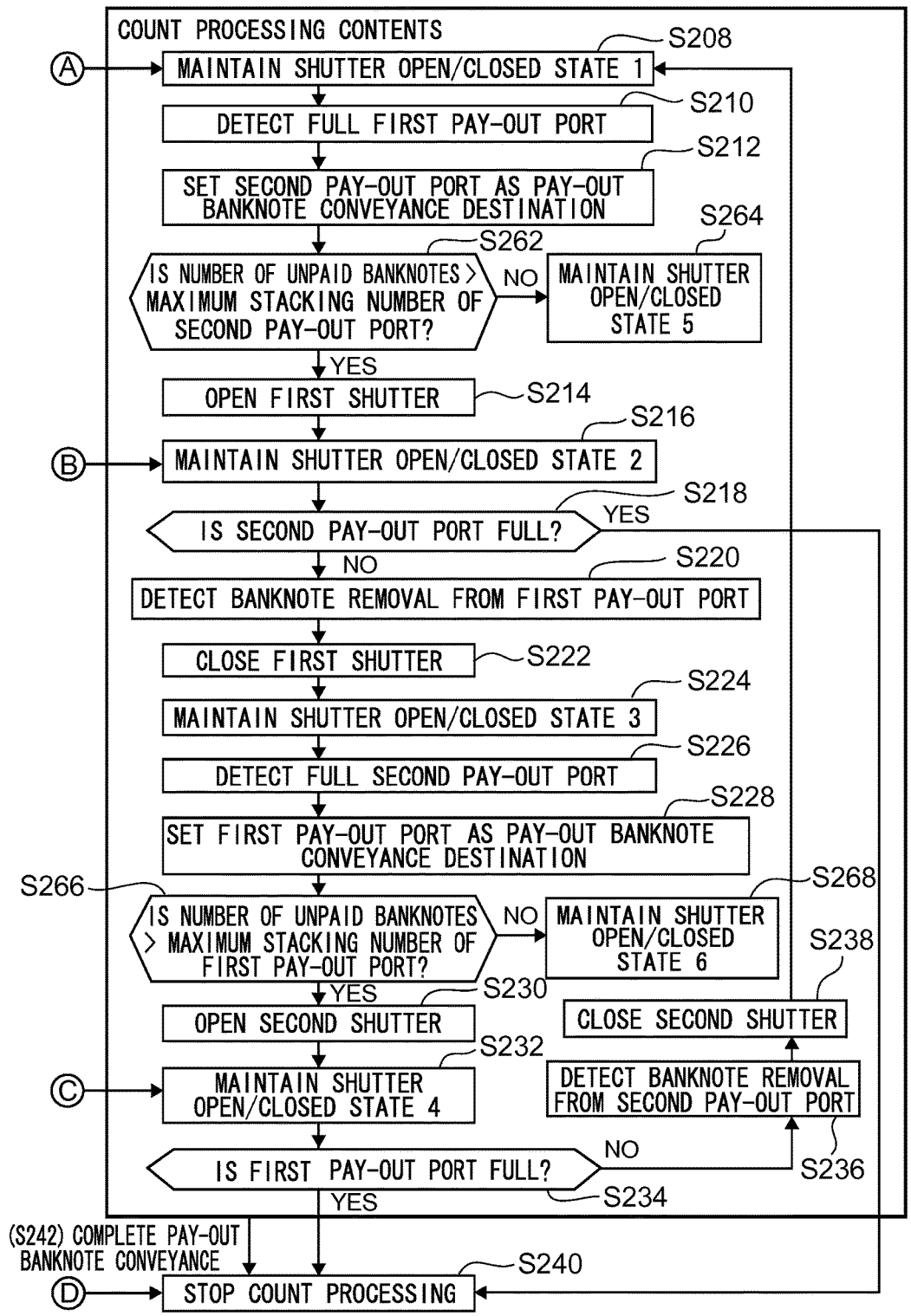
FIG. 9B is a continuation of the flow chart of FIG. 9A.
Figure 10A:
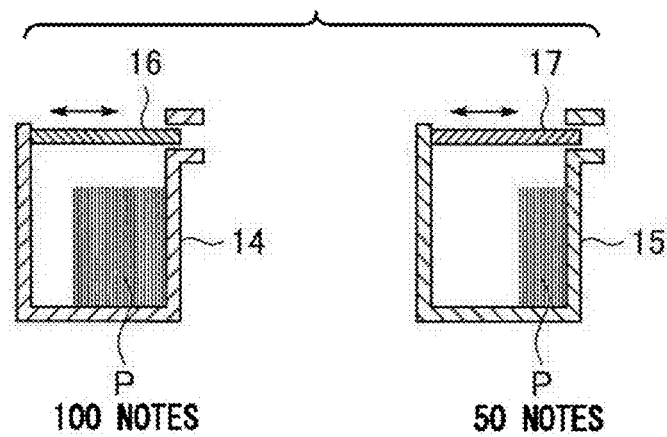
FIG. 10A is a diagram to explain a relationship between banknote stacking numbers in the first pay-out port 14 and the second pay-out port 15, and opening operations of the first shutter 16 and the second shutter 17.
Figure 10B:
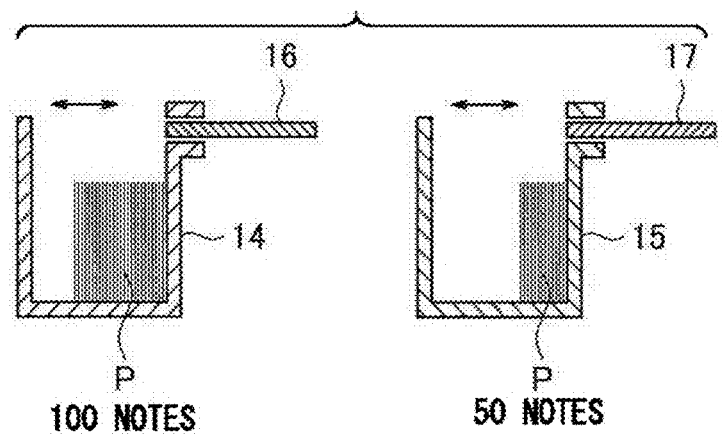
FIG. 10B is another diagram to explain a relationship between banknote stacking numbers in the first pay-out port 14 and the second pay-out port 15, and opening operations of the first shutter 16 and the second shutter 17.

FIGS. 8A and 8B are a flow chart illustrating an example of pay-out processing according to the second exemplary embodiment. FIGS. 9A and 9B are a flow chart illustrating an example of count processing according to the second exemplary embodiment. FIGS. 10A and 10B are drawings to explain a relationship between banknote stacking numbers in the first pay-out port 14 and second pay-out port 15, and opening operations of the first shutter 16 and the second shutter 17.

Similarly to the first exemplary embodiment, in the flow chart in FIGS. 8A and 8B, on receipt of a pay-out processing instruction the controller 70 starts a pay-out operation as instructed, and performs count processing (steps S102 to S108).

In the count processing according to the second exemplary embodiment illustrated in FIGS. 9A and 9B, when switching between the destination pay-out ports of conveyed pay-out banknotes, determination is made as to whether or not the number of pay-out banknotes to be stacked in the switched-to destination pay-out port is greater than the maximum stacking number for the switched-to destination pay-out port.

Specifically, when switching the pay-out banknote conveyance destination from the first pay-out port 14 to the second pay-out port 15 at step S212, the controller 70 determines whether or not the number of pay-out banknotes (unpaid banknotes) for conveyance to the second pay-out port 15 is greater than the maximum stacking number (100 notes) of the second pay-out port 15 (step S262). If the number of unpaid banknotes is greater than the maximum stacking number of the second pay-out port 15 at step S262 (Yes), the controller 70 opens the first shutter 16 of the first pay-out port 14 (step S214). Due to opening the first shutter 16 (see FIG. 7B), the cashier is able to remove the banknotes stacked in the first pay-out port 14 while pay-out banknotes are being conveyed to the second pay-out port 15.

However, if the number of unpaid banknotes (say, 50 notes in this case) is the maximum stacking number of the second pay-out port 15 or fewer at step S262 (No), the controller 70 maintains a shutter open/closed state 5 in which the first shutter 16 and the second shutter 17 are closed, and does not open the first shutter 16 (step S264). The cashier is therefore unable to remove the pay-out banknotes stacked in the first pay-out port 14 while the pay-out banknotes are being conveyed to the second pay-out port 15. As a result, when conveyance of the pay-out banknotes to the second pay-out port 15 is completed, count processing is stopped in a state in which the pay-out banknotes are stacked in both the first pay-out port 14 and the second pay-out port 15, as illustrated in FIG. 10A (step S240).

Similarly, when switching the conveyance destination of the pay-out banknotes from the second pay-out port 15 to the first pay-out port 14 at step S228, the controller 70 determines whether or not the number of pay-out banknotes (unpaid banknotes) for conveyance to the first pay-out port 14 is greater than the maximum stacking number (100 notes) of the first pay-out port 14 (step S266). If the number of unpaid banknotes is greater than the maximum stacking number at step S266 (Yes), the controller 70 opens the second shutter 17 (step S230).

However, if the number of unpaid banknotes is the maximum stacking number or fewer at step S266 (No), the controller 70 maintains a shutter open/closed state 6 in which the first shutter 16 and the second shutter 17 are closed, and does not open the second shutter 17 (step S268). Accordingly, when conveyance of the pay-out banknotes to the first pay-out port 14 is completed, count processing is stopped in a state in which the pay-out banknotes are stacked in both the first pay-out port 14 and the second pay-out port 15 (step S240).

In FIGS. 9A and 9B, the processing content of steps other than the steps described above is similar to that of the first exemplary embodiment, so detailed explanation thereof is omitted. In the second exemplary embodiment, the processing of the flow chart in FIGS. 9A and 9B is repeated until count processing is stopped. When count processing is stopped, processing returns to the flow chart in FIG. 8A, and pay-out processing continues. Namely, when the count processing of step S108 is stopped, the controller 70 determines the reason for stopping the pay-out banknotes (step S110).

If the reason for stopping at step S110 is that both the first pay-out port 14 and the second pay-out port 15 are Full, the controller 70 performs the processing of step S112 to step S122, similarly to the first exemplary embodiment.

However, if the reason for stopping at step S110 is that pay-out banknote conveyance has been completed, the controller 70 processes parallel opening operations for the first shutter 16 and the second shutter 17. Namely, the controller 70 determines whether or not pay-out banknotes are stacked in the first pay-out port 14 (step S162), and if banknotes are stacked in the first pay-out port 14 at step S162 (Yes), the controller 70 opens the first shutter 16 (step S164). At the same time, the controller 70 determines whether or not pay-out banknotes are stacked in the second pay-out port 15 (step S166), and if banknotes are stacked in the second pay-out port 15 at step S166 (Yes), the controller 70 opens the second shutter 17 (step S168).

Accordingly, as illustrated by steps S264, S268 in FIG. 9B, in cases in which count processing has stopped in a state in which pay-out banknotes are stacked in both the first pay-out port 14 and the second pay-out port 15, since the number of unpaid banknotes was the maximum stacking number of the first pay-out port 14 or the second pay-out port 15 or fewer, the first shutter 16 and the second shutter 17 are opened together (for example, at the same time as each other), as illustrated in FIG. 10B. Opening the first shutter 16 and the second shutter 17 together for example enables the cashier to confirm that all of the pay-out banknotes have been conveyed to the first pay-out port 14 and the second pay-out port 15.

The processing of the subsequent steps S130 to S138 is similar to that of the first exemplary embodiment, and so detailed explanation thereof is omitted. This processing completes the pay-out processing routine according to the second exemplary embodiment.

Although detailed explanation regarding preferable exemplary embodiments of the present invention, with reference to the attached drawings, has been given above, the present invention is not limited to these examples. It would be clear to a practitioner familiar with the technical field of the present invention that various modifications and adjustments may be implemented within the scope of the technical concept recited in the claims, and any such modifications and adjustments are obviously included within the technical scope of the present invention.

The respective processing steps of the banknote processing device 10 described above need not be performed in a time sequence matching the sequence illustrated in the flow charts. For example, the respective processing steps of the banknote processing device 10 may be formed in a different sequence to the sequence illustrated in the flow charts, or may be performed parallel to each other.

Moreover, a computer program may be produced such that functions equivalent to the respective configurations of the banknote processing device 10 described above are implemented by hardware such as a CPU, ROM and RAM installed in the banknote processing device 10.

In the exemplary embodiments described above, explanation has been given in which the banknote processing device 10 is applied to a cashier-operated terminal, however there is no limitation thereto. For example, application may be made to a cash processing section of an automated transaction device exemplified by an Automated Teller Machine (ATM) that cycles (recycles) banknotes, and that is a customer-operated terminal. Automated transaction devices are installed in a wide range of locations, such as in banks, railway stations and convenience stores. A customer can perform transactions such as deposits, withdrawals, and balance enquiries by performing various operations using a display screen displayed by the automated transaction device.

The disclosure of Japanese Patent Application No. 2012-177066 is incorporated herein by reference in its entirety.

All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. A banknote processing device comprising:
    a first pay-out port and a second pay-out port in which banknotes for pay-out are stacked;
    a conveyance section that conveys banknotes to the first pay-out port or to the second pay-out port;
    a first opening-closing member capable of opening and closing the first pay-out port by moving;
    a second opening-closing member capable of opening and closing the second pay-out port by moving; and a controller that controls conveyance of the banknotes by the conveyance section, and that controls opening and closing operations of the first opening-closing member and the second opening-closing member, wherein the controller controls the first opening-closing member and the second opening-closing member to maintain a first shutter state in which both the first opening-closing member and the second opening-closing member are closed while the conveyance section conveys banknotes to the first pay-out port, the controller performs a switching operation to switch a conveyance destination of the banknotes from the first pay-out port to the second pay-out port based on detecting that the number of banknotes stacked in the first pay-out port has reached a maximum stacking number, and after performing the switching operation, the controller controls the first and second opening-closing members to maintain a second shutter state in which the first opening-closing member is open and the second opening-closing member is closed while the conveyance section conveys banknotes to the second pay-out port.

2. The banknote processing device of claim 1, wherein:
the controller opens the first opening-closing member after switching the conveyance destination from the first pay-out port to the second pay-out port.

3. The banknote processing device of claim 1, further comprising:
a detection section that detects removal of stacked banknotes from the first pay-out port or the second pay-out port, wherein
the controller performs a closing operation to close the first opening-closing member to maintain the first opening-closing member and the second opening-closing member in a third shutter state, in which the first opening-closing member and the second opening-closing member are closed, based on the detection section detecting the banknotes stacked in the first pay-out port have been removed while the first opening-closing member and the second opening-closing member are in the second shutter state.

4. The banknote processing device of claim 1, wherein:
the controller stops conveyance of the banknotes to the first pay-out port and the second pay-out port based on detecting the banknotes stacked in the first pay-out port have not been removed and the second pay-out port is full while the first opening-closing member and the second opening-closing member are in the second shutter state.

5. The banknote processing device of claim 3, wherein the
the controller performs a switching operation to switch the conveyance destination from the second pay-out port to the first pay-out port, and performs an opening operation to open the second opening-closing member to maintain the first pay-out port and the second pay-out port in a fourth shutter state in which the second opening-closing member is open and the first opening-closing member is closed based on detecting that the number of banknotes stacked in the second pay-out port has reached a maximum stacking number while the first pay-out port and the second pay-out port are in the third shutter state.

6. A banknote processing device comprising:
a first pay-out port and a second pay-out port in which banknotes for pay-out are stacked;
a conveyance section that conveys banknotes to the first pay-out port or to the second pay-out port;

a first opening-closing member capable of opening and closing the first pay-out port by moving;
a second opening-closing member capable of opening and closing the second pay-out port by moving; and
a controller that controls conveyance of the banknotes by the conveyance section, and that controls opening and closing operations of the first opening-closing member and the second opening-closing member, wherein the controller controls the first opening-closing member and the second opening-closing member to maintain a first shutter state in which both the first opening-closing member and the second opening-closing member are closed while the conveyance section conveys banknotes to the first pay-out port, the controller performs a switching operation to switch a conveyance destination of the banknotes from the first pay-out port to the second pay-out port based on detecting that the number of banknotes stacked in the first pay-out port has reached a maximum stacking number, after performing the switching operation, the controller compares a number of banknotes to be conveyed against a maximum stacking number of the second pay-out port, the controller varies a timing of an opening operation of the first opening-closing member and the second opening-closing member according to whether or not the number of banknotes is greater than the maximum stacking number, wherein the controller is configured to control the first opening-closing member and the second opening-closing member to maintain a second shutter state in which the first opening-closing member is open and the second opening-closing member is closed while the conveyance section conveys banknotes to the second pay-out port, based on determining that the number of banknotes to be conveyed after performing the switching operation is greater than the maximum stacking number of the second pay-out port.

7. The banknote processing device of claim 6, wherein the controller is configured to open the first opening-closing member and the second opening-closing member at the same time after conveyance of the banknotes to the second pay-out port has been completed based on determining that the number of banknotes is the maximum stacking number of the second pay-out port or fewer.

8. A banknote processing method for controlling conveyance of banknotes for pay-out to a first pay-out port and a second pay-out port, and controlling opening and closing operations of a first opening-closing member capable of opening and closing the first pay-out port and a second opening-closing member capable of opening and closing the second pay-out port, the banknote processing method comprising:
controlling the first and second opening-closing members to maintain a first shutter state in which the first and second opening-closing members are closed;
conveying the banknotes to the first pay-out port while the first and second opening-closing members are in the first shutter state;
performing a switching operation to switch a conveyance destination of the banknotes from the first pay-out port to the second pay-out port based on determining that the number of stacked banknotes conveyed to the first pay-out port has reached a maximum stacking number in pay-out processing;

after performing the switching operation, controlling the first opening-closing member and the second opening-closing member to maintain a second shutter state in which the first opening-closing member is open and the second opening-closing member is closed by performing an opening operation to open the first opening-closing member after switching the conveyance destination from the first pay-out port to the second pay-out port; and conveying the banknotes to the second pay-out port after switching and while the first opening-closing member and the second opening-closing member are in the second shutter state.

\* \* \* \* \*